May 10, 1938.  M. L. HELEHAN  2,117,061
LIP STENCIL
Filed May 21, 1937
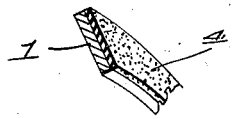
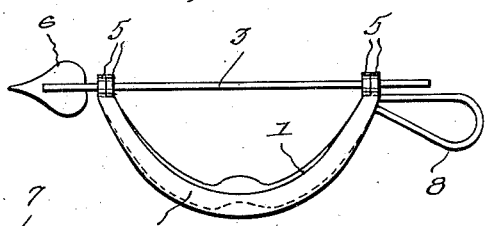
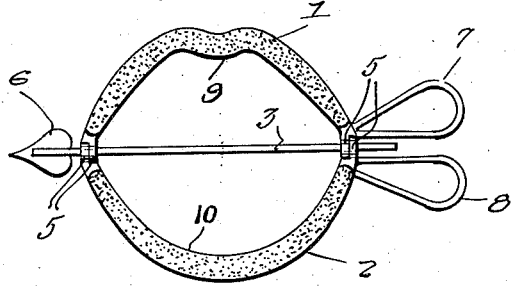
Inventor
M. L. Helehan
By Clarence A. O'Brien
Hyman Berman
Attorneys Patented May 10, 1938

2,117,061

UNITED STATES PATENT OFFICE 2,117,061

LIP STENCIL

Marie L. Helehan, Butte, Mont.

Application May 21, 1937, Serial No. 144,041

5 Claims. (Cl. 132—1)

My invention relates to improvements in lip stencilling devices for use in applying lipstick to the lips.

The invention is designed with the primary purpose in view of providing an efficient device of this character for surrounding the lips when opened to provide an accurate symmetrical lip outline, or pattern, corresponding in design on both sides of the mouth and by means of which lipstick can be quickly and easily applied to the lips to color the same in accordance with a selected design suitable to different types of mouths.

Other objects are to provide a device of the character and for the purpose above set forth which is foldable into compact form when not in use, adapted to be accurately centered or registered with the edge of the lips when the latter are open, is light in weight yet strong and durable, and comparatively inexpensive to manufacture.

To the accomplishment of the above and subordinate objects presently appearing, a preferred embodiment of my invention has been illustrated in the accompanying drawing, set forth in detail in the following description and defined in the claims appended hereto.

In said drawing:

Figure 1 is a view in perspective of my improved stencilling device illustrating the application and use of the same, Figure 2 is a view in rear elevation with the parts positioned as when in use, Figure 3 is a similar view of the device folded, and Figure 4 is a fragmentary view in perspective illustrating a cross section of one of the frames.

Describing my invention in detail, with reference to the drawing by numerals, in the preferred embodiment thereof, the device of my invention comprises a pair of upper and lower bowed, or crescent shaped, stencil frames 1 and 2 swingably mounted at the ends thereof upon a straight rod 3 for movement around the same into opposed, oppositely bowed open relation, or into side-by-side closed or folded position. Frames 1 and 2 are preferably formed of a suitable light, thin, flat metal, chromium or nickel-plated, and faced on the rear sides thereof with a facing 4 of rubber or other similar material for preventing the device from slipping when applied against the lips.

Each frame 1 and 2 is formed with eye-like ends 5 through which the rod 3 extends and said ends of one frame are disposed within the ends of the other frame, whereby each is held in proper relation to the other. The ends of the rod 3 extend for a suitable distance beyond the ends 5 of the frames 1 and 2, and one end of the rod 3 has suitably secured thereto a flat spear-head-like member 6, all for a purpose presently appearing. On the side of the device, opposite to the spear-head member 6, a pair of looped rod-like handgrips 7 and 8 are suitably secured to the frames 1 and 2 respectively to extend therefrom parallel with the rod 3. The inner edges 9 and 10 of the frames 1 and 2 are formed in the outline which it is desired to impart to the upper and lower lips as will be understood.

In using the described device, the handgrips 7 and 8 are grasped between the thumb and forefinger and the device pressed against the opened lips with the extended ends of the rod 3 pressed into the corners of the mouth whereby the device is centered and registered with the edges of the lips, the spear-head member 6 being pressed flat against the cheeks whereby the rod 3 is prevented from turning in the corners of the mouth and thereby irritating the same. The pressure exerted against the handgrips 7 and 8 tends to urge the frames 1 and 2 around the rod 3 firmly against the lips as will be seen. The lipstick may then be applied to the lips within the limits of the frames 1 and 2, that is to say, within the confines of the inner edges 9 and 10 thereof, to form a clean-cut accurate and symmetrical outline around the same. When the device is not in use, the frames 1 and 2 may be folded on the rod 3 in side-by-side relation as shown in Figure 3 to form a compact unit for carrying in a pocketbook, vanity case, or the like.

The described device may be made in different sizes to fit different sizes of mouths, and with different edge contours to outline different types of lips, for instance, thick and thin, etc. Another advantage is that the lips may be selectively positioned against the device to expose as much, or as little, of the lips as desired for the application of the lipstick thereto. As will be understood, the facing 4 prevents the device from slipping from location and forms a soft comfortable backing around the mouth.

The construction, use and advantages of my invention will, it is believed, be clear from the foregoing description, but, it is to be understood that the present disclosure is illustrative of a preferred embodiment of my invention only, and that modifications in details described may be resorted to without departing from the inventive concept. Hence, right is herein reserved to all such modifications falling within the scope of the claims appended hereto.

What I claim is:

1. A lip stencilling device comprising a pair of upper and lower crescent shaped frames pivotally mounted at both ends thereof for relative swinging movement about a common axis.

2. A lip stencilling device comprising a pair of upper and lower crescent shaped frames pivotally mounted at both ends thereof for relative swinging movement about a common axis, and a pair of handgrips secured to said frames respectively, parallel with the pivotal axis thereof and upon opposite sides of the latter respectively.

3. A lip stencilling device comprising a straight rod, a pair of upper and lower crescent shaped frames swingably mounted at the ends thereof on said rod for movement thereon into and from opposed relation, said rod extending at its opposite ends beyond the ends of said frame, and a pair of handgrips secured to and extending from said frames adjacent corresponding ends thereof respectively.

4. A lip stencilling device comprising a straight rod, a pair of upper and lower crescent shaped frames swingably mounted at the ends thereof on said rod for movement thereon into and from opposed relation, said rod extending at its opposite ends beyond the ends of said frames, and a pair of handgrips secured to and extending from said frames adjacent corresponding ends thereof respectively, one of said frames having its ends disposed within the ends of the other against lengthwise movement of said one frame relative to the other.

5. A lip stencilling device comprising a straight rod, a pair of upper and lower crescent shaped frames swingably mounted at the ends thereof on said rod for movement thereon into and from opposed relations, said rod extending at its opposite ends beyond the ends of said frames, and a pair of handgrips secured to and extending from said frames adjacent corresponding ends thereof respectively, one of said frames having its ends disposed within the ends of the other against lengthwise movement of said one frame relative to the other, said rod extending beyond the ends of said frames, and a spear-head member secured on the end of the rod opposite to the handgrip ends of the frames.

MARIE L. HELEHAN.